US012674687B2

(12) United States Patent
Hirota et al.

(10) Patent No.: US 12,674,687 B2
(45) Date of Patent: Jul. 7, 2026

(54) SENSOR DEVICE AND METHOD OF MANUFACTURING THE SAME

(71) Applicant: TDK CORPORATION, Tokyo (JP)

(72) Inventors: Yohei Hirota, Tokyo (JP); Shuhei Miyazaki, Tokyo (JP); Fumiya Sado, Tokyo (JP)

(73) Assignee: TDK CORPORATION, Tokyo (JP)

( * ) Notice: Subject to any disclaimer, the term of this patent is extended or adjusted under 35 U.S.C. 154(b) by 103 days.

(21) Appl. No.: 18/479,999

(22) Filed: Oct. 3, 2023

(65) Prior Publication Data

US 2024/0210212 A1 Jun. 27, 2024

(30) Foreign Application Priority Data

Dec. 26, 2022 (JP) ................................. 2022-209013

(51) Int. Cl.
*G01D 5/16* (2006.01)
*G01L 1/22* (2006.01)
(52) U.S. Cl.
CPC . *G01D 5/16* (2013.01); *G01L 1/22* (2013.01)
(58) Field of Classification Search
CPC ........ G01R 33/0052; G01R 33/06–098; G01L 1/20; G01L 1/22; G01D 5/12; G01D 5/14; G01D 5/142; G01D 5/145; G01D 5/16; H01L 21/56
See application file for complete search history.

(56) References Cited

U.S. PATENT DOCUMENTS

| | | | |
|---|---|---|---|
| 8,354,297 B2* | 1/2013 | Pagaila | H10W 90/701 |
| | | | 438/126 |
| 2004/0025598 A1* | 2/2004 | Forster | F15B 13/0857 |
| | | | 73/861.71 |

(Continued)

FOREIGN PATENT DOCUMENTS

| | | |
|---|---|---|
| JP | 2019-21840 A | 2/2019 |
| JP | 2021-532361 A | 11/2021 |
| WO | 2014/083746 A1 | 6/2014 |

OTHER PUBLICATIONS

Feb. 3, 2026 Office Action issued in JP Patent Application No. 2022-209013.

*Primary Examiner* — Huy Q Phan
*Assistant Examiner* — David B Frederiksen
(74) *Attorney, Agent, or Firm* — Oliff PLC

(57) ABSTRACT
A sensor device includes a support, a sensor chip, and an electrically-conductive pillar. The support has a first surface. The sensor chip is provided on the first surface and includes a substrate and a sensor element circuitry. The substrate has a second surface. The sensor element circuitry is provided on the second surface. The electrically-conductive pillar is provided on the first surface. The electrically-conductive pillar has a pillar height from the first surface to an upper end of the electrically-conductive pillar. The sensor chip has a chip height from the first surface to the second surface. The pillar height is greater than the chip height. The electrically-conductive pillar includes a structure in which a first tier part having a first cross-sectional area and a second tier part having a second cross-sectional area smaller than the first cross-sectional area are stacked in order from the first surface.

11 Claims, 9 Drawing Sheets

(56)             References Cited

U.S. PATENT DOCUMENTS

| | | | |
|---|---|---|---|
| 2009/0146283 A1* | 6/2009 | Chen | H01L 25/0657 |
| | | | 257/E25.01 |
| 2011/0045634 A1* | 2/2011 | Pagaila | H01L 24/96 |
| | | | 438/107 |
| 2011/0186977 A1* | 8/2011 | Chi | H01L 25/0652 |
| | | | 257/E23.141 |
| 2012/0056316 A1* | 3/2012 | Pagaila | H01L 24/97 |
| | | | 257/737 |
| 2013/0277831 A1* | 10/2013 | Yoon | H01L 24/13 |
| | | | 257/737 |
| 2016/0043239 A1* | 2/2016 | Chang | H10F 39/809 |
| | | | 257/433 |
| 2016/0056125 A1* | 2/2016 | Pan | H01L 24/24 |
| | | | 257/676 |
| 2017/0373031 A1* | 12/2017 | Yajima | H01L 23/3157 |
| 2018/0277394 A1 | 9/2018 | Huemoeller et al. | |
| 2019/0043806 A1* | 2/2019 | Hsu | H10W 20/42 |
| 2021/0118860 A1* | 4/2021 | Wu | H01L 25/18 |
| 2022/0165674 A1* | 5/2022 | Hsu | H01L 23/5389 |

\* cited by examiner

SENSOR DEVICE AND METHOD OF MANUFACTURING THE SAME

CROSS-REFERENCE TO RELATED APPLICATIONS

The present application claims priority from Japanese Patent Application No. 2022-209013 filed on Dec. 26, 2022, the entire contents of which are hereby incorporated by reference.

BACKGROUND

The disclosure relates to a sensor device and a method of manufacturing the sensor device.

A small-sized sensor device with a sensor element provided on a substrate has been used in various applications. Examples of such a small-sized sensor device may include an optical device serving as an image sensor device. The optical device may include an optical element that is provided on a transparent substate and performs, for example, photoelectric conversion on incident light. For example, reference is made to International Publication No. WO 2014/083746.

SUMMARY

A sensor device according to one embodiment of the disclosure includes a support, a sensor chip, and an electrically-conductive pillar. The support has a first surface. The sensor chip is provided on the first surface and includes a substrate and a sensor element circuitry. The substrate has a second surface. The sensor element circuitry is provided on the second surface. The electrically-conductive pillar is provided on the first surface. The electrically-conductive pillar has a pillar height from the first surface to an upper end of the electrically-conductive pillar. The sensor chip has a chip height from the first surface to the second surface. The pillar height is greater than the chip height. The electrically-conductive pillar includes a structure in which a first tier part having a first cross-sectional area and a second tier part having a second cross-sectional area smaller than the first cross-sectional area are stacked in order from the first surface.

A method of manufacturing a sensor device according to one embodiment of the disclosure includes: preparing a support having a first surface; forming a first tier part on the first surface; disposing a sensor chip on the first surface at a location different from a location of the first tier part, the sensor chip including a substrate, a sensor element circuitry, and a pad part, the substrate having a second surface, the sensor element circuitry and the pad part being provided on the second surface; forming an insulating film to cover the first tier part formed on the first surface and the sensor chip disposed on the first surface; forming, in the insulating film, a first opening at a location corresponding to the first tier part and a second opening at a location corresponding to the pad part; and forming an electrically-conductive pillar including the first tier part and a second tier part stacked on the first tier part, by forming an electrically-conductive film to fill each of the first opening and the second opening and to selectively cover a portion of the insulating film.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
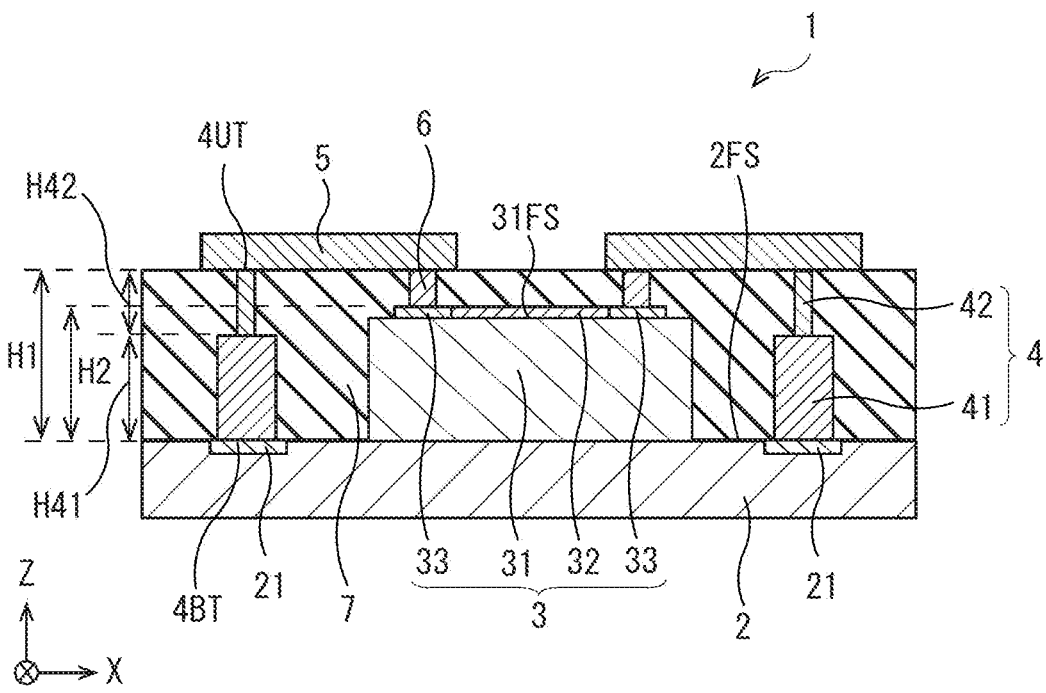
FIG. 1A is a cross-sectional diagram illustrating an overall configuration example of an angle sensor device according to one example embodiment of the disclosure.

It is desired that a sensor device have stable detection sensitivity and be smaller in size.

It is desirable to provide a sensor device that provides more stable detection performance and is adaptable to further reduction in size, and a method of manufacturing such a sensor device.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. Note that the description is given in the following order.

0. Background
1. Example Embodiment: an example of an angle sensor device including a magnetoresistive effect element
    1.1. Configuration of Angle Sensor Device 1
    1.2. Method of Manufacturing Angle Sensor Device 1
    1.3. Example Workings and Example Effects

0. Background

An angle sensor device has been used that detects, for example, an orientation or a rotation angle of an object by sensing a change in an external magnetic field, for example. Such an angle sensor device may be disposed in a limited space in the vicinity of a rotating body with a magnet attached thereto. Accordingly, reduction in size is demanded of the angle sensor device itself. Furthermore, improved measurement accuracy is also demanded. To meet such demands, it is desirable to densely pack a larger number of sensor elements in a limited region.

Having conducted many studies and improvements to address the above technical challenges, the Applicant has finally arrived at providing an angle sensor device that provides high measurement accuracy and is adaptable to further reduction in size.

1. First Example Embodiment

1.1. Configuration of Angle Sensor Device 1

A description will be given first of a configuration of an angle sensor device 1 according to an example embodiment of the disclosure with reference to FIGS. 1A to 2. The angle sensor device 1 may correspond to a specific but non-limiting example of a "sensor device" in one embodiment of the disclosure.

Figure 1B:
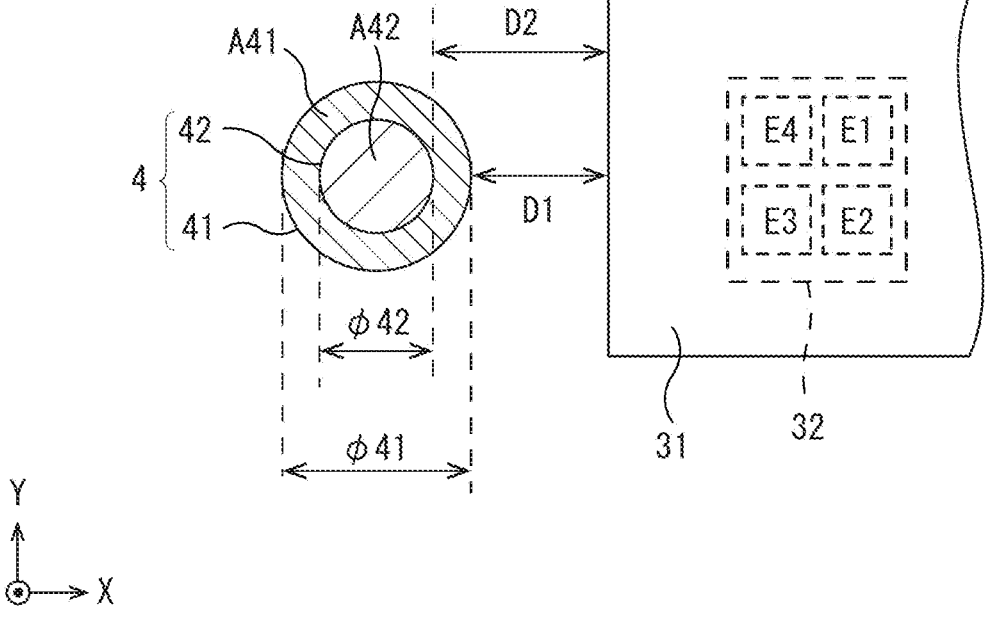
FIG. 1B is an enlarged schematic plan view of a portion of the angle sensor device illustrated in FIG. 1A.
Figure 2:
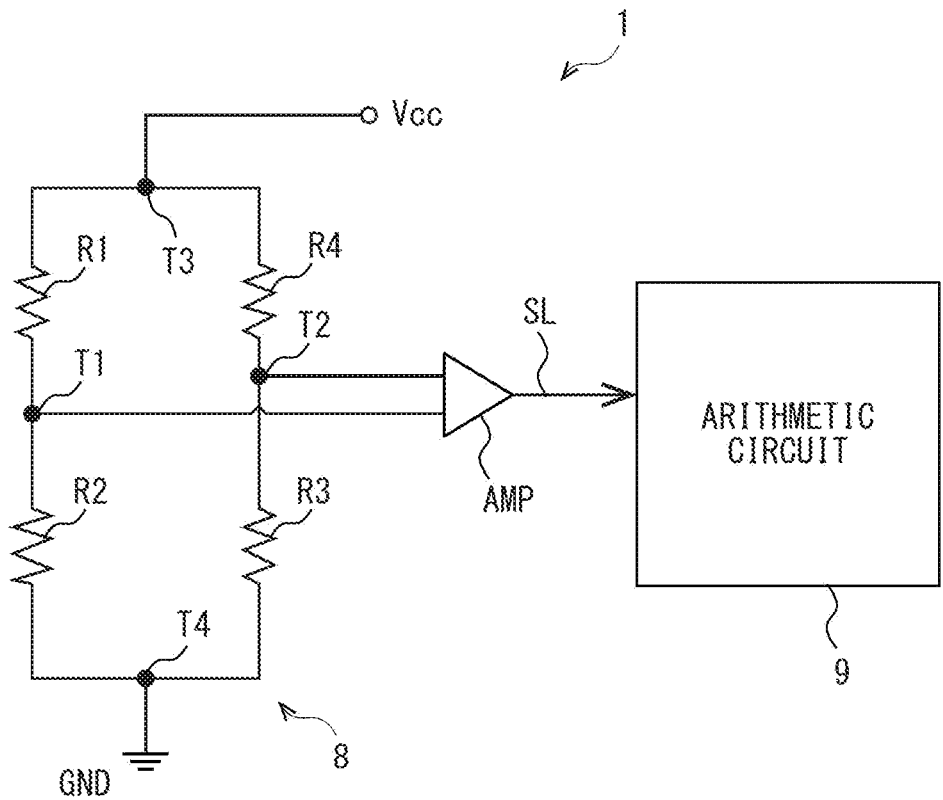
FIG. 2 is a circuit diagram of the angle sensor device illustrated in FIG. 1A.
Figure 2:
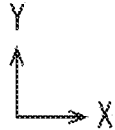

FIG. 1A is a schematic cross-sectional view of the angle sensor device 1. FIG. 1B is an enlarged plan view of a portion of the angle sensor device 1. As illustrated in FIG. 1A, the angle sensor device 1 may include a support substrate 2, a sensor chip 3, an electrically-conductive pillar 4, a wiring line 5, a coupling layer 6, and an insulating film 7.

The sensor chip 3 may be stacked on the support substrate 2. For example, the sensor chip 3 may be provided on a front surface 2FS of the support substrate 2. The sensor chip 3 may be covered with the insulating film 7. The electrically-conductive pillar 4 may be provided on the front surface 2FS of the support substrate 2 at a location different from a location of the sensor chip 3, and may be adjacent to the sensor chip 3. The electrically-conductive pillar 4 may extend in a thickness direction or a Z-axis direction through the insulating film 7.

In the angle sensor device 1 according to the example embodiment, the support substrate 2 and the sensor chip 3 may each extend along an XY plane including an X-axis direction and a Y-axis direction orthogonal to each other. The Z-axis direction may correspond to the thickness direction of the support substrate 2 and the sensor chip 3 in the example embodiment.

Support Substrate 2

The support substrate 2 may include an application-specific integrated circuit (ASIC), for example. The front surface 2FS of the support substrate 2 may be provided with a terminal part 21. Note that the support substrate 2 is not limited to a substrate including the ASIC, and may be a simple Si substrate or sapphire substrate, or may be a relay substrate that performs relaying between a substrate including an ASIC and the sensor chip 3, for example. The support substrate 2 of the example embodiment may correspond to a specific but non-limiting example of a "support" in one embodiment of the disclosure. Note that the "support" in one embodiment of the disclosure may be a combination of, for example, the support substrate 2 and any layer provided thereon. Examples of the layer that may be provided on the support substrate 2 may include, without limitation, an insulating layer.

Sensor Chip 3

The sensor chip 3 may have an external appearance of, for example, a substantially quadrangular prism shape which is substantially square or rectangular in a planar view along the XY plane. The sensor chip 3 may have a stacked structure including a sensor substrate 31 and a sensor element circuitry 32. The sensor chip 3 may further include a pad part 33 that is electrically continuous with the sensor element circuitry 32.

The sensor substrate 31 may be a silicon substrate, for example. The sensor substrate 31 may have a thickness of 200 μm or less, for example. The sensor substrate 31 may be a flat plate member having a front surface 31FS that is substantially square or rectangular in a planar view. The front surface 31FS may be a flat surface that is substantially orthogonal to the Z-axis direction, i.e., the thickness direction of the sensor substrate 31.

The sensor element circuitry 32 may be provided in, for example, a middle region on the front surface 31FS of the sensor substrate 31. The sensor element circuitry 32 may include one or more magnetic sensor elements E. For example, the magnetic sensor elements E may be tunneling magnetoresistive effect (TMR) elements. The magnetic sensor elements E may each have sensitivity that varies depending on a stress such as a thermal stress or a mechanical stress. The sensor element circuitry 32 may include a plurality of magnetic sensor elements E. In the configuration example illustrated in FIG. 1B, the sensor element circuitry 32 may include, as the plurality of magnetic sensor element E, four magnetic sensor elements E1 to E4 arranged in a matrix. The magnetic sensor elements E1 to E4 may each include, for example, TMR films and wiring lines coupling the TMR films in series to each other. The magnetic sensor elements E1 to E4 may configure resistors R1 to R4 of a full-bridge circuit 8 illustrated in FIG. 2, for example. FIG. 2 is a circuit diagram illustrating a circuit configuration example of the angle sensor device 1. The angle sensor device 1 may include the full-bridge circuit 8, a difference detector AMP, and an arithmetic circuit 9, for example. The angle sensor device 1 may be configured to detect a change in an external magnetic field applied to the sensor chip 3, based on a difference between a potential obtained at a node T1 and a potential obtained at a node T2 in the full-bridge circuit 8.

The full-bridge circuit 8 may include the four resistors R1 to R4. The resistor R1 may include the magnetic sensor element E1, the resistor R2 may include the magnetic sensor element E2, the resistor R3 may include the magnetic sensor element E3, and the resistor R4 may include the magnetic sensor element E4. The full-bridge circuit 8 may have a configuration in which the resistors R1 and R2 coupled in series and the resistors R3 and R4 coupled in series are coupled in parallel to each other. For example, in the full-bridge circuit 8, a first end of the resistor R1 and a first end of the resistor R2 may be coupled to each other at the node T1; a first end of the resistor R3 and a first end of the resistor R4 may be coupled to each other at the node T2; a second end of the resistor R1 and a second end of the resistor R4 may be coupled to each other at a node T3; and a second end of the resistor R2 and a second end of the resistor R3 may be coupled to each other at a node T4. The node T3 may be coupled to a power supply Vcc, and the node T4 may be coupled to a ground terminal GND. The node T1 and the node T2 may each be coupled to an input-side terminal of the difference detector AMP.

The resistors R1 to R4 may each be configured to detect a change in a signal magnetic field to be detected. For example, the resistors R1 and R3 may each decrease in resistance value in response to application of a signal magnetic field in a +Y direction, and may each increase in resistance value in response to application of a signal magnetic field in a −Y direction. The resistors R2 and R4 may each increase in resistance value in response to application of the signal magnetic field in the +Y direction, and may each decrease in resistance value in response to application of the signal magnetic field in the -Y direction. Accordingly, a signal to be outputted from each of the resistors R1 and R3 in response to a change in the signal magnetic field and a signal to be outputted from each of the resistors R2 and R4 in response to the change in the signal magnetic field may be different in phase by 180 degrees from each other, for example. The signals extracted from the resistors R1 to R4 of the full-bridge circuit 8 may flow into the difference detector AMP. The difference detector AMP may detect a potential difference between the nodes T1 and T2 that results when a voltage is applied between the nodes T3 and T4, and may output the detected difference to the arithmetic circuit 9 as a difference signal SL.

Electrically-Conductive Pillar 4

As described above, the electrically-conductive pillar 4 may be provided on the front surface 2FS of the support substrate 2 at the location different from the location of the sensor chip 3, and may be electrically coupled to the sensor element circuitry 32 via the wiring line 5, the coupling layer 6, and the pad part 33. The electrically-conductive pillar 4 may include, for example, a highly electrically-conductive material such as copper (Cu). The electrically-conductive pillar 4 may have a lower end 4BT coupled to the terminal part 21 provided on the front surface 2FS of the support substrate 2. The electrically-conductive pillar 4 has a pillar height H1 from the front surface 2FS to an upper end 4UT of the electrically-conductive pillar 4. The sensor chip 3 has a chip height H2 from the front surface 2FS to the front surface 31FS. The pillar height H1 is greater than the chip height H2. The electrically-conductive pillar 4 includes a structure in which a first tier part 41 and a second tier part 42 are stacked in order from the front surface 2FS. As illustrated in FIG. 1B, the first tier part 41 may have a cross-sectional area A41 greater than a cross-sectional area A42 of the second tier part 42. In the example embodiment illustrated in FIG. 1B, the first tier part 41 and the second tier part 42 may each have a substantially cylindrical outer shape. Accordingly, the first tier part 41 may have an outer diameter φ41 greater than an outer diameter φ42 of the second tier part 42. As a result, in the XY plane, the first tier part 41 may be located at a first distance D1 from the sensor substrate 31 of the sensor chip 3, the second tier part 42 may be located at a second distance D2 from the sensor substrate 31 of the sensor chip 3, and the second distance D2 may be greater than the first distance D1. The first tier part 41 may have a first height H41 in the Z-axis direction. The second tier part 42 may have a second height H42 in the Z-axis direction. In some embodiments, the first height H41 may be greater than the second height H42.

Insulating Film 7

The insulating film 7 may include, for example, a resin material such as polyimide or an epoxy resin.

Wiring Line 5

The wiring line 5 may be provided over the sensor chip 3 and the electrically-conductive pillar 4. Accordingly, the sensor chip 3 and the electrically-conductive pillar 4 may each be provided in a tier between the support substrate 2 and the wiring line 5. The wiring line 5 may include an electrically-conductive material, and may electrically couple the sensor element circuitry 32 and the electrically-conductive pillar 4 to each other. Non-limiting examples of the electrically-conductive material may include copper (Cu), aluminum (Al), and tungsten (W). In the configuration example illustrated in FIG. 1A, the wiring line 5 may have a lower surface in contact with the upper end 4UT of the electrically-conductive pillar 4 and with an upper end of the coupling layer 6. The coupling layer 6 may have a lower end in contact with the pad part 33 provided on the front surface 31FS of the sensor substrate 31.

1.2. Method of Manufacturing Angle Sensor Device 1

A description will now be given of a method of manufacturing the angle sensor device 1 according to an example embodiment of the disclosure with reference to FIGS. 3A to 3E, in addition to FIGS. 1A and 1B. FIGS. 3A to 3E schematically illustrate steps of an example method of manufacturing the angle sensor device 1.

Figure 3A:
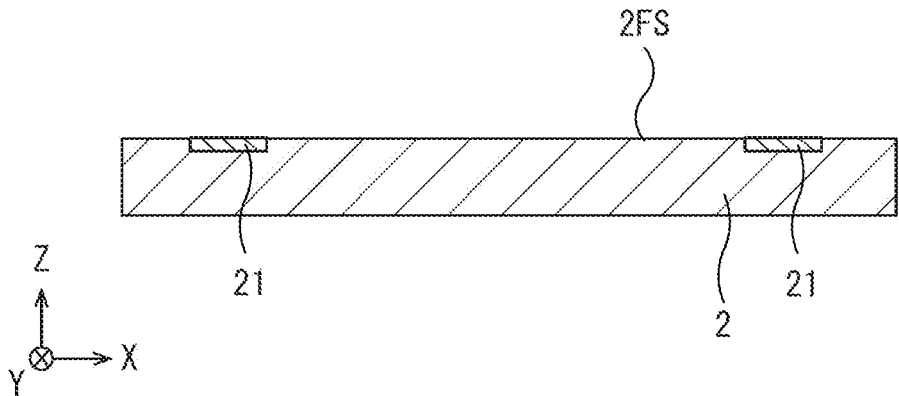
FIG. 3A is an explanatory diagram illustrating a step of an example method of manufacturing the angle sensor device illustrated in FIG. 1A.

First, the support substrate 2 is prepared. Thereafter, as illustrated in FIG. 3A, the terminal part 21 may be formed on the front surface 2FS of the support substrate 2.

Figure 3B:
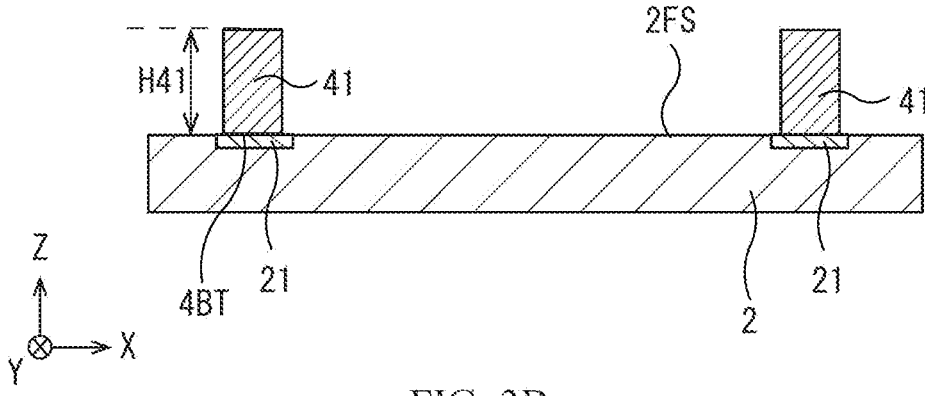
FIG. 3B is an explanatory diagram illustrating a step that follows the step of FIG. 3A.

Thereafter, as illustrated in FIG. 3B, the first tier part 41 having the first height H41 may be formed on the terminal part 21 by a suitable method such as an electroplating method.

Figure 3C:
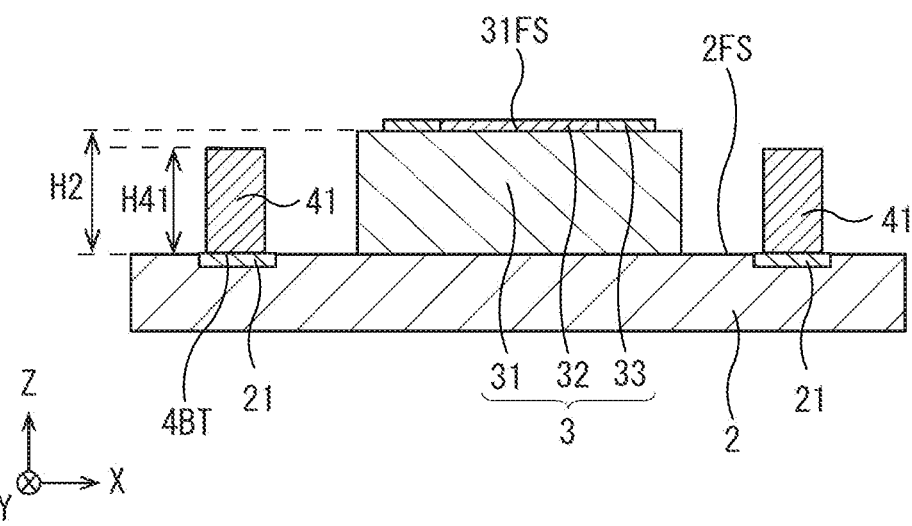
FIG. 3C is an explanatory diagram illustrating a step that follows the step of FIG. 3B.

Thereafter, a plurality of sensor element circuitries 32 and a plurality of pad parts 33 may be formed on a mother substrate, such as a silicon wafer, that is to be cut later into a plurality of sensor substrates 31. The sensor element circuitries 32 may each include the magnetic sensor elements E1 to E4. Thereafter, the foregoing mother substrate may be cut to separate respective regions corresponding to the sensor element circuitries 32 from each other. A plurality of sensor chips 3 may thus be formed, each of the sensor chips 3 having the sensor element circuitry 32 and the pad part 33 on the front surface 31FS of the sensor substrate 31. Thereafter, as illustrated in FIG. 3C, the sensor chip 3 may be placed on the front surface 2FS of the support substrate 2. At this time, a thickness of the sensor substrate 31 may be adjusted to cause the chip height H2 of the sensor chip 3 to be greater than the first height H41 of the first tier part 41.

Figure 3D:
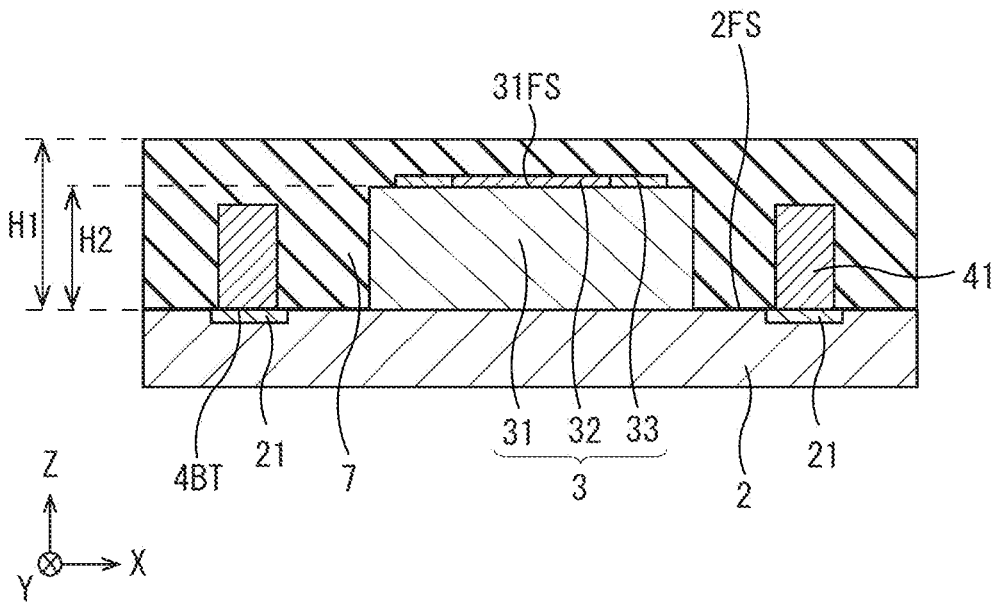
FIG. 3D is an explanatory diagram illustrating a step that follows the step of FIG. 3C.

Thereafter, as illustrated in FIG. 3D, the insulating film 7 may be formed to cover the front surface 2FS of the support substrate 2, the first tier part 41, and the sensor chip 3. For example, the insulating film 7 may be formed to fill a space between the first tier part 41 and the sensor chip 3. Further, the insulating film 7 may be formed into a thickness greater than the chip height H2 to thereby cause an upper surface of the insulating film 7 to be at a level higher than a level of the front surface 31FS of the sensor chip 3. Non-limiting examples of a method of forming the insulating film 7 may include a spin coating method, a printing method, a lamination method, a transfer molding method, and a compression molding method.

Figure 3E:
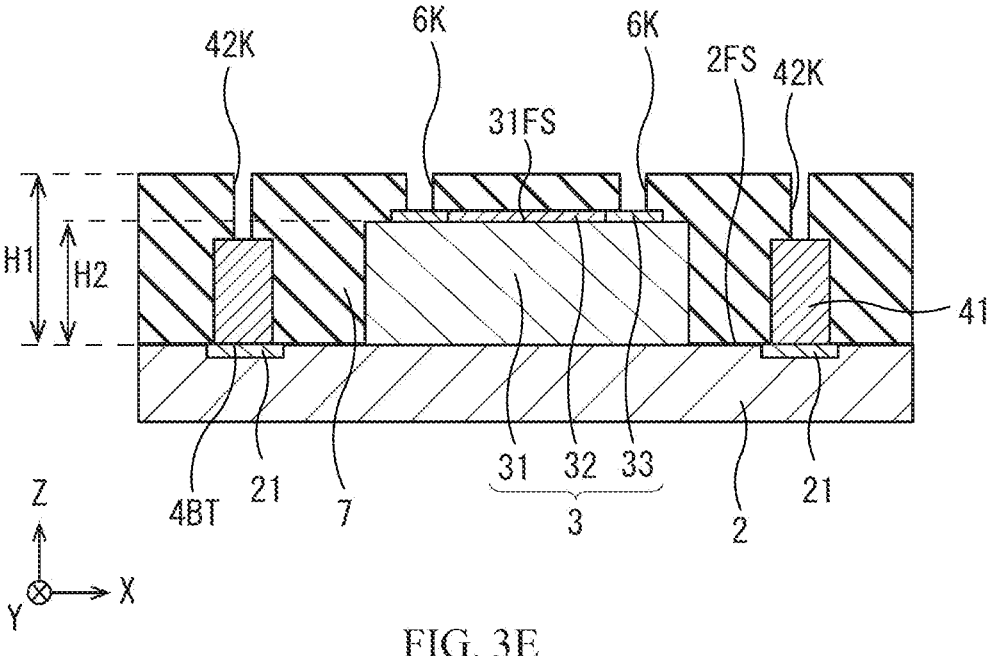
FIG. 3E is an explanatory diagram illustrating a step that follows the step of FIG. 3D.

Thereafter, as illustrated in FIG. 3E, an opening may be formed at a predetermined location in the insulating film 7. For example, an opening 42K may be formed at a location corresponding to the first tier part 41 in the Z-axis direction, and an opening 6K may be formed at a location corresponding to the pad part 33 in the Z-axis direction. Forming the opening 42K may expose a portion of an upper surface of the first tier part 41. Forming the opening 6K may expose a portion of an upper surface of the pad part 33. When the insulating film 7 includes a photosensitive material, the openings 42K and 6K may be formed by a photolithography method, for example. When the insulating film 7 includes a non-photosensitive material, the openings 42K and 6K may be formed by laser processing or chemical treatment, for example. Here, an opening cross-sectional area of the opening 42K along the XY plane may be caused to be smaller than the cross-sectional area A41 (see FIG. 1B) of the first tier part 41 along the XY plane.

Figure 3F:
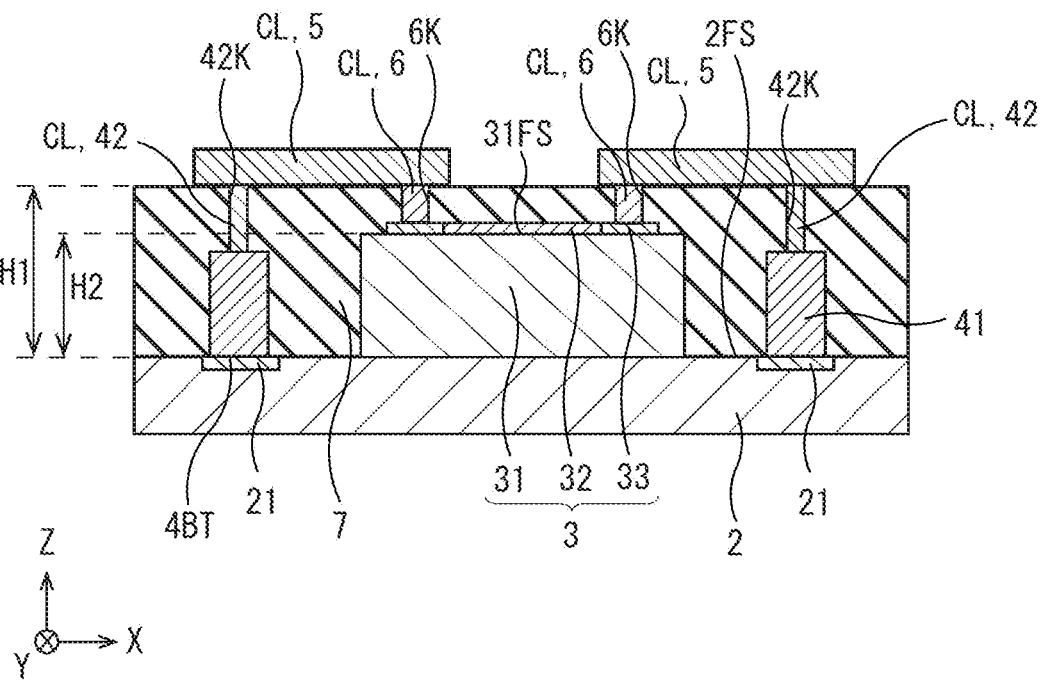
FIG. 3F is an explanatory diagram illustrating a step that follows the step of FIG. 3E.
Figure 3G:
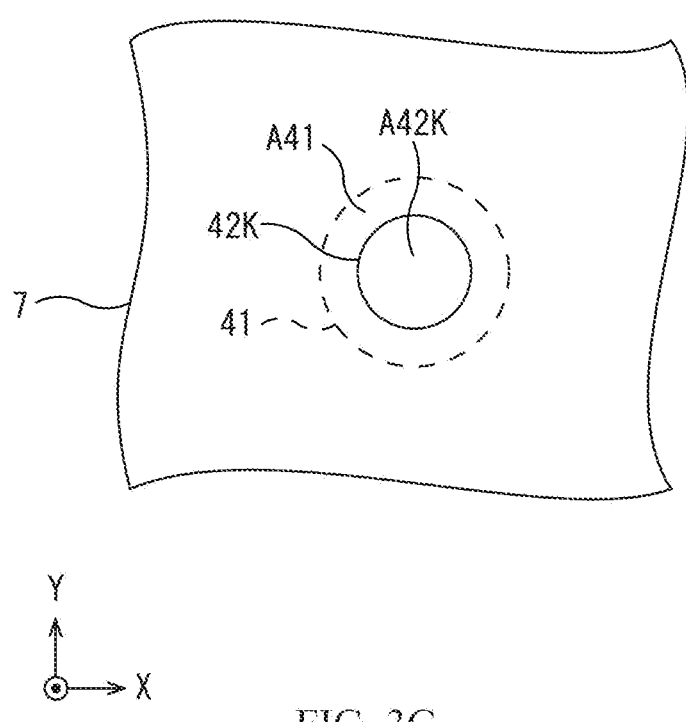
FIG. 3G is another explanatory diagram illustrating the step that follows the step of FIG. 3E.

Thereafter, as illustrated in FIG. 3F, the second tier part 42, the wiring line 5, and the coupling layer 6 may be formed by forming an electrically-conductive film CL that fills each of the openings 42K and 6K and selectively covers a portion of the insulating film 7. The second tier part 42, the wiring line 5, and the coupling layer 6 may be formed by any of suitable methods including, without limitation, a sputtering method, a chemical vapor deposition (CVD) method, an electroless plating method, and an electroplating method. For example, a depth of the opening 42K, that is, a thickness of a portion of the insulating film 7 covering the sensor chip 3, may be adjusted to cause the second height H42 of the second tier part 42 to be smaller than the first height H41. Further, as illustrated in FIG. 3G, the opening cross-sectional area (denoted as A42K) of the opening 42K along the XY plane may be caused to be smaller than the cross-sectional area A41 of the first tier part 41 along the XY plane, as described above. This makes it possible for the cross-sectional area A42 (see FIG. 1B) of the second tier part 42 along the XY plane to be smaller than the cross-sectional area A41 of the first tier part 41. Note that FIG. 3G is an enlarged plan view of a portion of the angle sensor device 1 and illustrates a step corresponding to FIG. 3F.

The angle sensor device 1 according to the example embodiment illustrated in FIG. 1A may be completed in the above-described manner.

1.3. Example Workings and Example Effects

As described above, the angle sensor device 1 according to the example embodiment includes the sensor chip 3 and the electrically-conductive pillar 4 on the front surface 2FS of the support substrate 2. The sensor chip 3 includes the sensor substrate 31 having the front surface 31FS, and the sensor element circuitry 32 provided on the front surface 31FS. The electrically-conductive pillar 4 may be electrically coupled to the sensor element circuitry 32. The sensor chip 3 and the electrically-conductive pillar 4 may be adjacent to each other. The electrically-conductive pillar 4 has the pillar height H1 from the front surface 2FS to the upper end 4UT of the electrically-conductive pillar 4, the sensor chip 3 has the chip height H2 from the front surface 2FS to the front surface 31FS, and the pillar height H1 is greater than the chip height H2. Further, the electrically-conductive pillar 4 includes a structure in which the first tier part 41 having the cross-sectional area A41 and the second tier part 42 having the cross-sectional area A42 smaller than the cross-sectional area A41 are stacked in order from the front surface 2FS. Accordingly, in the angle sensor device 1 of the example embodiment, even when the electrically-conductive pillar 4 is thermally expanded due to an increase in an ambient temperature or heating from outside, a thermal stress to be exerted on the sensor element circuitry 32 of the sensor chip 3 is reduced as compared with when the cross-sectional area A42 of the second tier part 42 is substantially equal to the cross-sectional area A41 of the first tier part 41. This stabilizes detection performance of the angle sensor device 1. The electrically-conductive pillar 4 and the sensor chip 3 may be disposed in closer proximity to each other to achieve a reduction in size of the angle sensor device 1. Even when employing such a configuration to achieve higher integration, the detection performance of the sensor element circuitry 32 is less susceptible to the thermal stress. The angle sensor device 1 according to the example embodiment thus provides more stable detection performance and is adaptable to further reduction in size.

Supposing, however, the cross-sectional area A42 of the second tier part 42 is substantially equal to or greater than the cross-sectional area A41 of the first tier part 41, the second tier part 42 would be thermally expanded greatly in response to an increase in the ambient temperature or heating from outside. In such a case, a greater thermal stress would be exerted on the sensor element circuitry 32 of the sensor chip 3 and can affect measurement accuracy of the sensor element circuitry 32. In contrast, according to the example embodiment, the cross-sectional area A42 of the second tier part 42 is smaller than the cross-sectional area A41 of the first tier part 41. This reduces thermal expansion of the second tier part 42 located near the sensor element circuitry 32. The angle sensor device 1 according to the example embodiment thus allows for ensuring more stable detection performance.

In some embodiments, in the angle sensor device 1, the second tier part 42 may be located to overlap with the sensor element circuitry 32 in an in-plane direction along the front surface 2FS. This helps to more effectively reduce an influence of the thermal stress.

In some embodiments, in the in-plane direction along the front surface 2FS in the angle sensor device 1, the first tier part 41 may be located at the first distance D1 from the sensor substrate 31 of the sensor chip 3, the second tier part 42 may be located at the second distance D2 from the sensor substrate 31 of the sensor chip 3, and the second distance D2 may be greater than the first distance D1. This helps to more effectively reduce the influence of the thermal stress.

Furthermore, in some embodiments, in the angle sensor device 1, the first tier part 42 may have the first height H1, the second tier part 42 may have the second height H2, and the first height H1 may be greater than the second height H2. This makes it possible for the opening 42K used to form the second tier part 42 to be small in outer diameter. As a result, it is possible for the angle sensor device 1 to be small in footprint in the in-plane direction, which helps to achieve further reduction in size of the angle sensor device 1.

In a method of manufacturing the angle sensor device 1 according to the example embodiment, the first tier part 41 formed upright on the front surface 2FS of the support substrate 2 may be buried in the insulating film 7, following which the opening 42K is formed in the insulating film 7. Thereafter, the second tier part 42 may be formed by filling the opening 42K with the electrically-conductive film. This helps to reduce a distance between the electrically-conductive pillar 4 and the sensor chip 3, as compared with a method of manufacturing an angle sensor device according to a first reference example illustrated in FIGS. 8A to 8D.

Figure 8A:
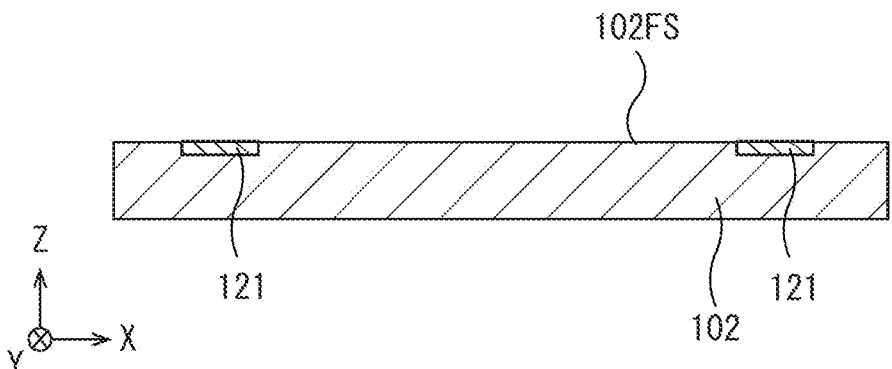
FIG. 8A is an explanatory diagram illustrating a step of an example method of manufacturing an angle sensor device according to a first reference example of one example embodiment of the disclosure.
Figure 8B:
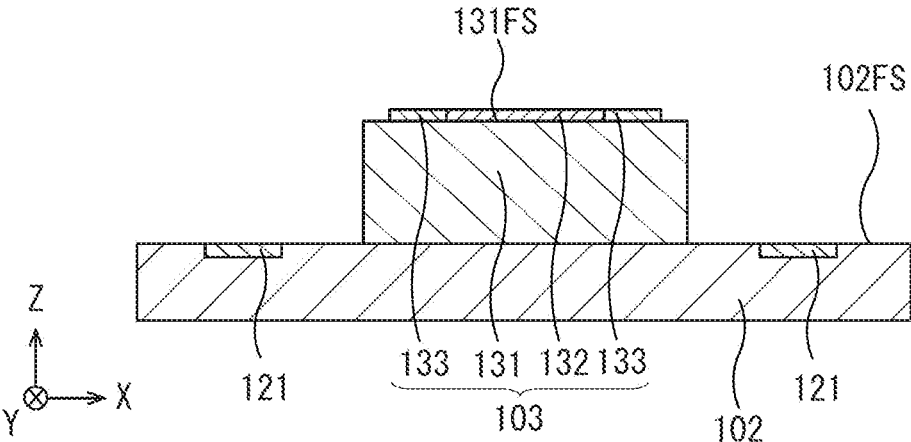
FIG. 8B is an explanatory diagram illustrating a step that follows the step of FIG. 8A.
Figure 8C:
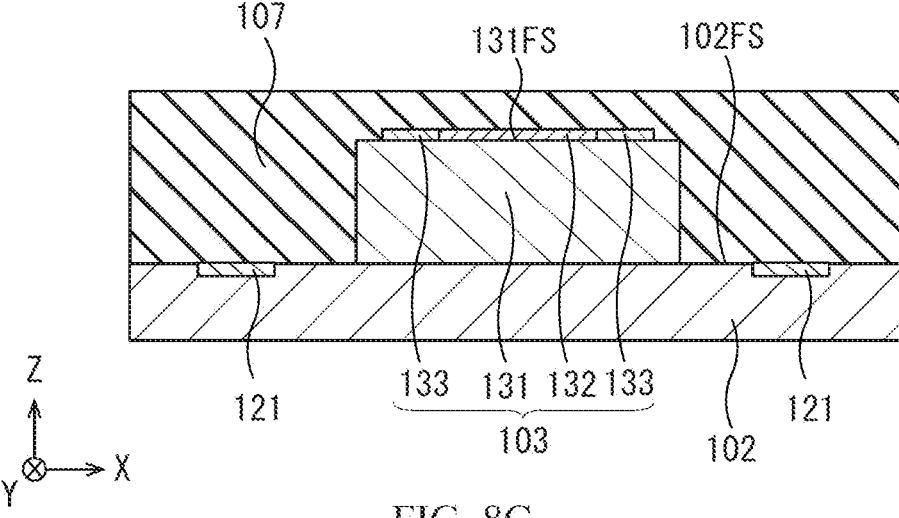
FIG. 8C is an explanatory diagram illustrating a step that follows the step of FIG. 8B.
Figure 8D:
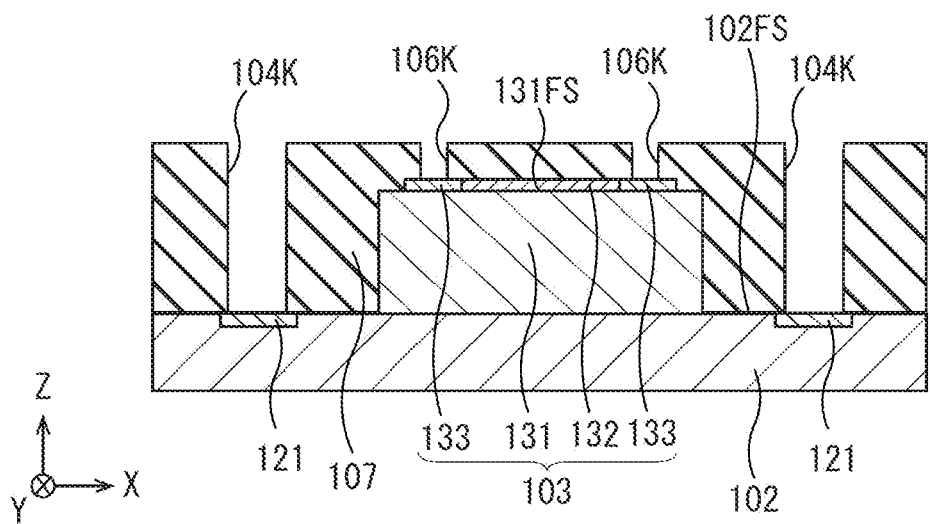
FIG. 8D is an explanatory diagram illustrating a step that follows the step of FIG. 8C.
Figure 8E:
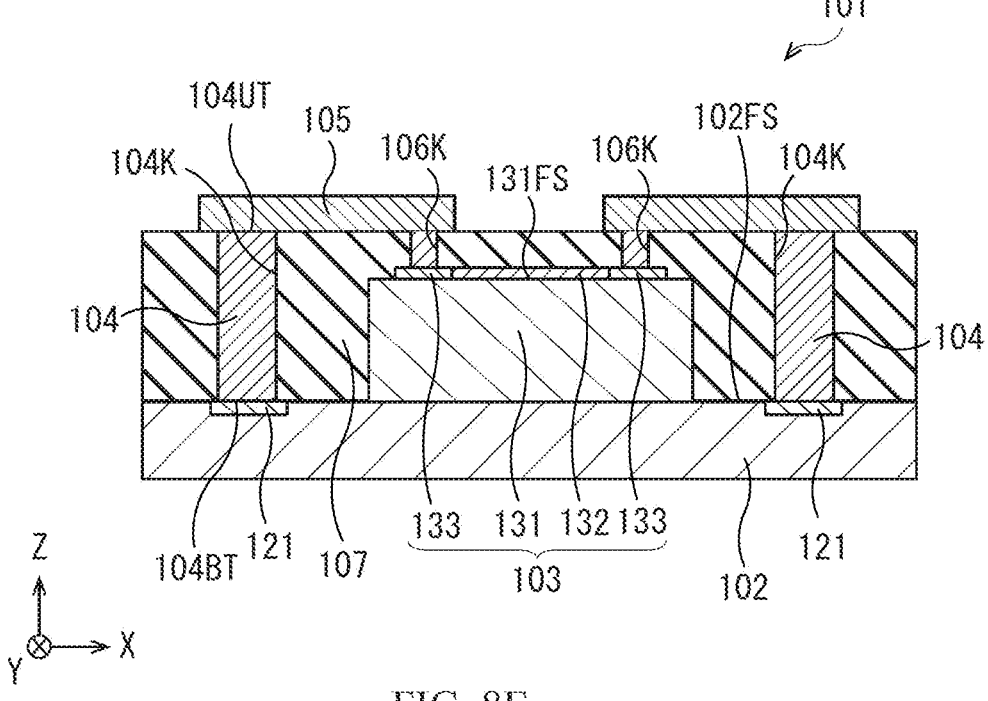
FIG. 8E is an explanatory diagram illustrating a step that follows the step of FIG. 8D.

For example, in the method of manufacturing the angle sensor device according to the first reference example, as illustrated in FIG. 8A, a terminal part 121 may be first formed on a front surface 102FS of a support substrate 102. Thereafter, as illustrated in FIG. 8B, a sensor chip 103 may be formed on the front surface 102FS at a location other than a location where the terminal part 121 is formed. The sensor chip 103 may be formed in advance by providing a sensor element circuitry 132 and a pad part 133 on a front surface 131FS of a sensor substrate 131. Thereafter, as illustrated in FIG. 8C, an insulating film 107 may be formed to cover the front surface 102FS of the support substrate 102 and the sensor chip 103. Thereafter, as illustrated in FIG. 8D, an opening 104K may be formed in the insulating film 107 at a location corresponding to the terminal part 121 in the Z-axis direction, and an opening 106K may be formed in the insulating film 107 at a location corresponding to the pad part 133 in the Z-axis direction. Thereafter, as illustrated in FIG. 8E, an electrically-conductive pillar 104, a wiring line 105, and a coupling layer 106 may be formed by filling the openings 104K and 106K with an electrically-conductive material and selectively covering a portion of the insulating film 107 with the electrically-conductive material. An angle sensor device 101 according to the first reference example may thus be completed. In the angle sensor device 101 obtained in such a manner, however, an upper end 104UT of the electrically-conductive pillar 104 is likely to have an outer diameter greater than an outer diameter of a lower end 104BT of the electrically-conductive pillar 104. One reason for this is that the opening 104K having a large depth may be formed in forming the electrically-conductive pillar 104. As a result, in many cases, the angle sensor device 101 according to the first reference example becomes larger in footprint in the in-plane direction than the angle sensor device 1 according to the example embodiment. In addition, with the method of manufacturing the angle sensor device 101, it is difficult to cause a portion of the electrically-conductive pillar 104 in the vicinity of the upper end 104UT to be smaller in outer diameter than a portion of the electrically-conductive pillar 104 in the vicinity of the lower end 104BT.

According to the angle sensor device 1 and the method of manufacturing the angle sensor device 1 of the example embodiment, the electrically-conductive pillar 4 has a structure in which the first tier part 41 and the second tier part 42 are stacked, and the first tier part 41 and the second tier part 42 may be fabricated in separate steps. This makes it possible for the opening 42K in the insulating film 7 to have a depth smaller than the depth of the opening 104K in the first reference example. Accordingly, it is possible for the angle sensor device 1 to be small in footprint in the in-plane direction. Further, fabricating the first tier part 41 and the second tier part 42 in separate steps makes it possible to cause the cross-sectional area A42 of the second tier part 42 to be smaller than the cross-sectional area A41 of the first tier part 41.

The example embodiment described above is to facilitate understanding of the disclosure, and are not intended to limit the disclosure. Each element disclosed in the foregoing example embodiment shall thus be construed to include all design modifications and equivalents that fall within the technical scope of the disclosure. In other words, the disclosure is not limited to the foregoing example embodiment, and may be modified in a variety of ways.

First Modification Example

Figure 4:
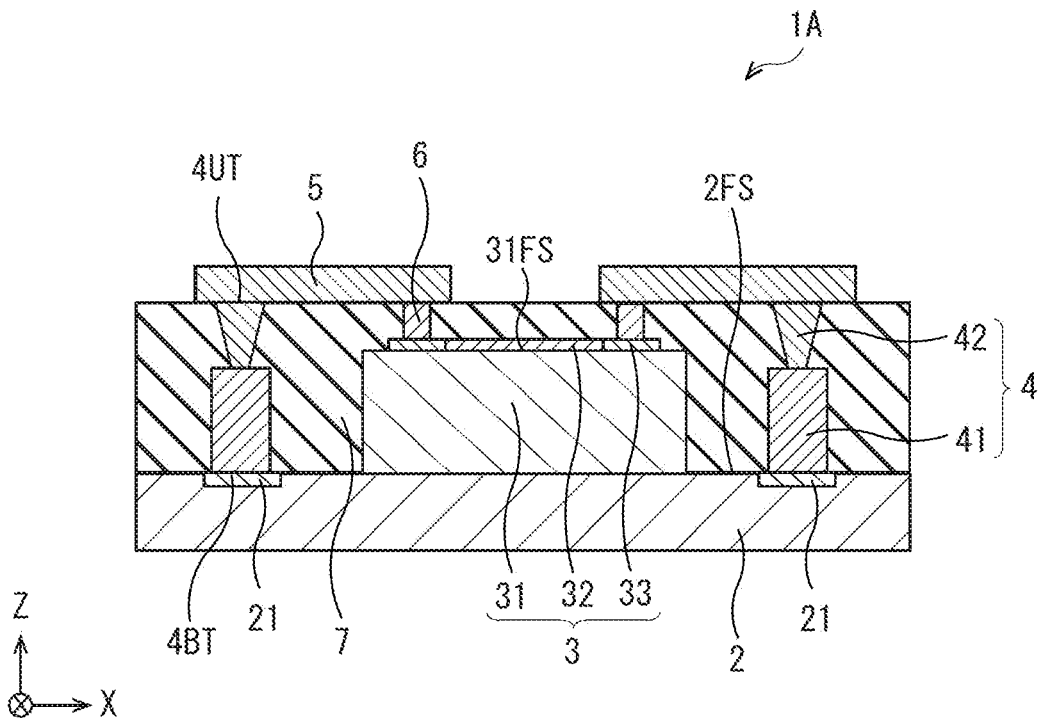
FIG. 4 is a cross-sectional diagram illustrating an overall configuration example of an angle sensor device according to a first modification example of one example embodiment of the disclosure.

For example, in the angle sensor device 1 according to the foregoing example embodiment, the cross-sectional area A42 of the second tier part 42 of the electrically-conductive pillar 4 may be constant in the height direction or the Z-axis direction, in other words, the second tier part 42 may be substantially cylindrical in outer shape. However, embodiments of the disclosure are not limited thereto. In some embodiments, as in an angle sensor device 1A according to a first modification example illustrated in FIG. 4, for example, the second tier part 42 may have an outer diameter that gradually changes in the Z-axis direction. FIG. 4 illustrates a configuration example in which the outer diameter of the second tier part 42 may gradually increase with increasing distance from the front surface 2FS of the support substrate 2. The angle sensor device 1A of FIG. 4 helps to reduce wiring resistance of the electrically-conductive pillar 4 as compared with the angle sensor device 1 illustrated in, for example, FIG. 1A.

Second Modification Example

Figure 5:
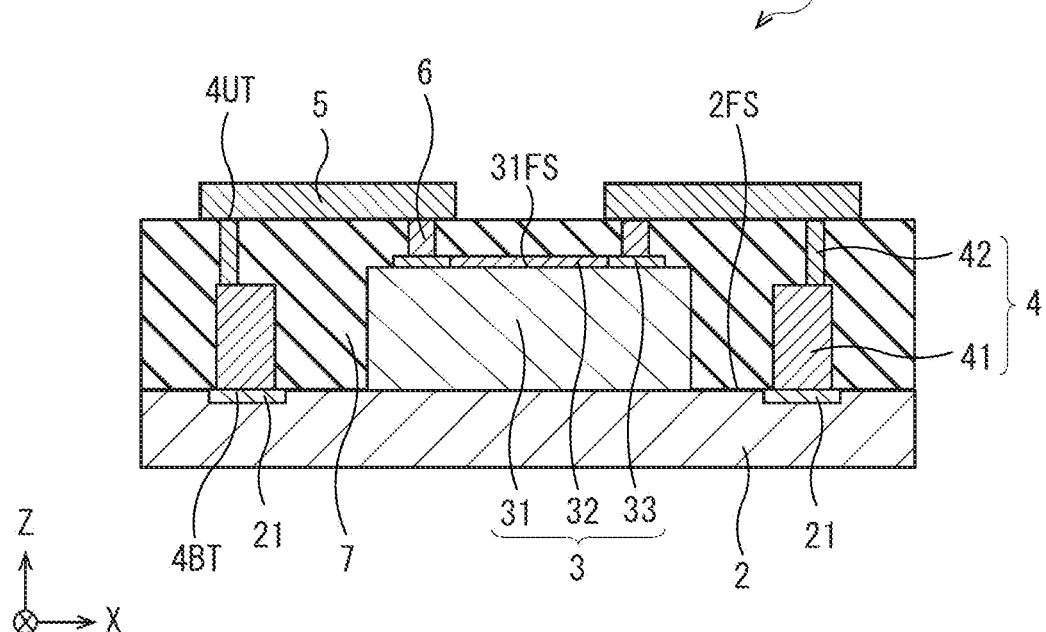
FIG. 5 is a cross-sectional diagram illustrating an overall configuration example of an angle sensor device according to a second modification example of one example embodiment of the disclosure.

Further, in some embodiments, as in an angle sensor device 1B according to a second modification example illustrated in FIG. 5, for example, a center position of the second tier part 42 may be located farther from the sensor element circuitry 32 than a center position of the first tier part 41 in the XY plane. This allows the second distance D2 to be even greater than that in the angle sensor device 1 illustrated in, for example, FIG. 1A. As a result, in the angle sensor device 1B, an induced magnetic field resulting from a current flowing through the second tier part 42 has a reduced influence on the sensor element circuitry 32, as compared with the angle sensor device 1. Accordingly, it is possible for the angle sensor device 1B to ensure even more stable detection performance.

Third Modification Example

Figure 6:
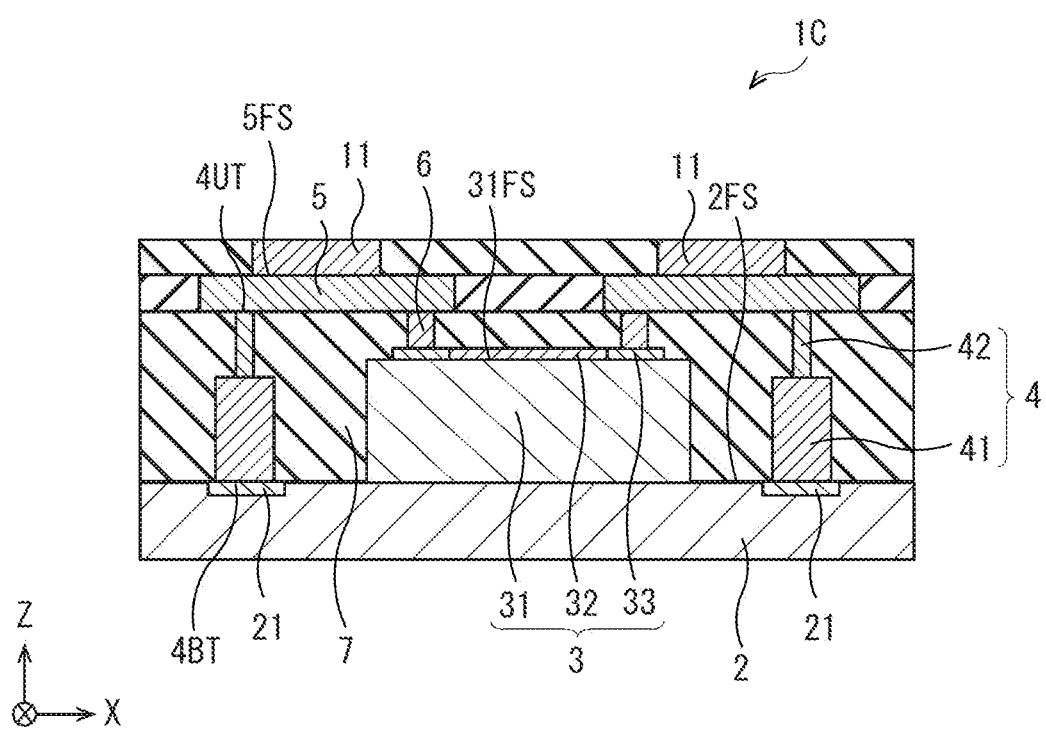
FIG. 6 is a cross-sectional diagram illustrating an overall configuration example of an angle sensor device according to a third modification example of one example embodiment of the disclosure.

Further, in some embodiments, as in an angle sensor device 1C according to a third modification example illustrated in FIG. 6, for example, an electrically-conductive layer 11 may further be provided on an upper surface 5FS, of the wiring line 5, farther from the support substrate 2. Non-limiting examples of the electrically-conductive layer 11 may include a solder layer, a flux, and a two-layered plating including nickel (Ni) and gold (Au). The electrically-conductive layer 11 may be used as an external-coupling terminal.

Fourth Modification Example

Figure 7:
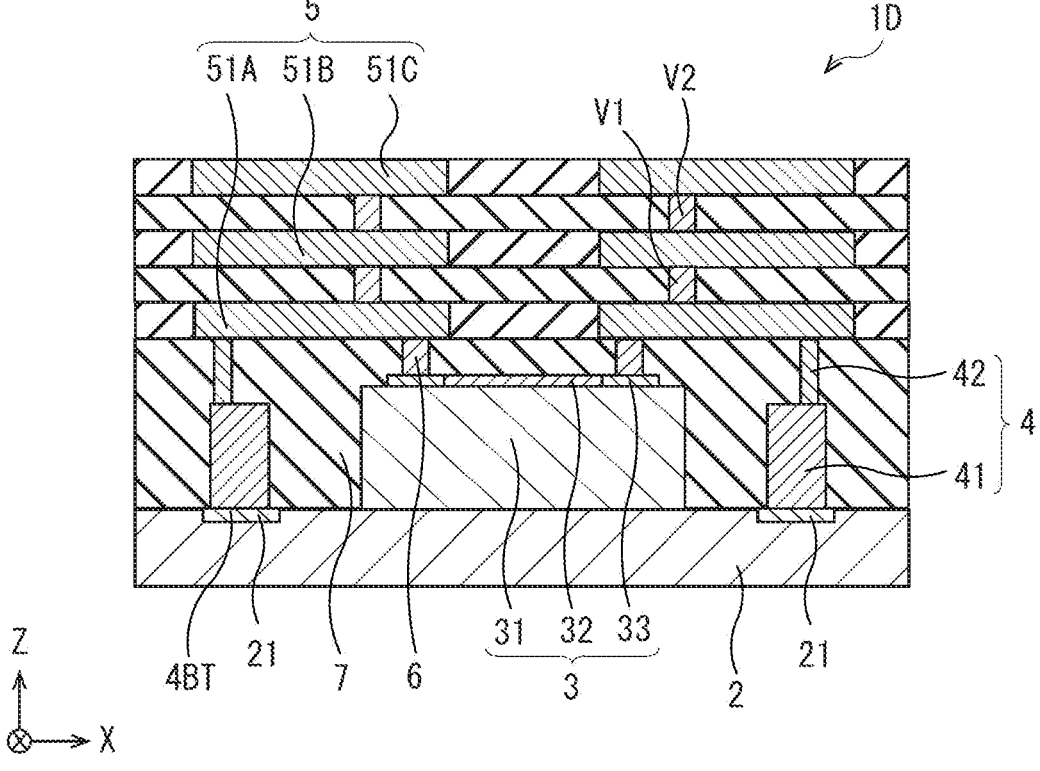
FIG. 7 is a cross-sectional diagram illustrating an overall configuration example of an angle sensor device according to a fourth modification example of one example embodiment of the disclosure.

Furthermore, in some embodiments, as in an angle sensor device 1D according to a fourth modification example illustrated in FIG. 7, for example, the wiring line 5 may be multilayered. For example, multiple wiring layers 51 (e.g., 51A to 51C) may be stacked with vias V (e.g., V1 and V2) interposed between respective adjacent two of the wiring layers 51 to thereby configure the wiring line 5.

In the foregoing example embodiment, the magnetic sensor element has been described as an example of the sensor element in the sensor element circuitry; however, embodiments of the disclosure are not limited thereto. In some embodiments, a strain sensor element such as a metal foil strain gauge may be used as the sensor element.

It is possible to achieve at least the following configurations from the foregoing example embodiment and modification examples of the disclosure.

(1)

A sensor device including:

a support having a first surface;

a sensor chip provided on the first surface and including a substrate and a sensor element circuitry, the substrate having a second surface, the sensor element circuitry being provided on the second surface; and an electrically-conductive pillar provided on the first surface, in which the electrically-conductive pillar has a pillar height from the first surface to an upper end of the electrically-conductive pillar, the sensor chip has a chip height from the first surface to the second surface, and the pillar height is greater than the chip height, and the electrically-conductive pillar includes a structure in which a first tier part having a first cross-sectional area and a second tier part having a second cross-sectional area smaller than the first cross-sectional area are stacked in order from the first surface.

(2)

The sensor device according to (1), in which the second tier part is located to overlap with the sensor element circuitry in an in-plane direction along the first surface.

(3)

The sensor device according to (1) or (2), in which, in an in-plane direction along the first surface, the first tier part is located at a first distance from the substrate of the sensor chip, the second tier part is located at a second distance from the substrate of the sensor chip, and the second distance is greater than the first distance.

(4)

The sensor device according to any one of (1) to (3), in which the sensor element circuitry includes a sensor element having sensitivity that varies depending on a stress.

(5)

The sensor device according to (4), in which the sensor element includes a magnetic sensor element or a strain sensor element.

(6)

The sensor device according to any one of (1) to (5), further including a wiring line that electrically couples the sensor element circuitry and the electrically-conductive pillar to each other, in which the sensor chip and the electrically-conductive pillar are each provided in a tier between the support and the wiring line.

(7)

The sensor device according to any one of (1) to (6), in which the first tier part has a first height, the second tier part has a second height, and the first height is greater than the second height.

(8)

The sensor device according to (6), further including an electrically-conductive layer provided on a surface, of the wiring line, farther from the support.

(9)

The sensor device according to any one of (1) to (8), in which the electrically-conductive pillar is provided on the first surface at a location different from a location of the sensor chip, and is electrically coupled to the sensor element circuitry.

(10)

A method of manufacturing a sensor device, the method including:

preparing a support having a first surface;

forming a first tier part on the first surface;

disposing a sensor chip on the first surface at a location different from a location of the first tier part, the sensor chip including a substrate, a sensor element circuitry, and a pad part, the substrate having a second surface, the sensor element circuitry and the pad part being provided on the second surface;

forming an insulating film to cover the first tier part formed on the first surface and the sensor chip disposed on the first surface;

forming, in the insulating film, a first opening at a location corresponding to the first tier part and a second opening at a location corresponding to the pad part; and forming an electrically-conductive pillar including the first tier part and a second tier part stacked on the first tier part, by forming an electrically-conductive film to fill each of the first opening and the second opening and to selectively cover a portion of the insulating film.

(11)

The method of manufacturing the sensor device according to (10), in which a second cross-sectional area of the second tier part along the first surface is smaller than a first cross-sectional area of the first tier part along the first surface, by causing an opening cross-sectional area of the first opening along the first surface to be smaller than the first cross-sectional area.

In a sensor device according to at least one embodiment of the disclosure, an electrically-conductive pillar coupled to a sensor element circuitry of a sensor chip includes a first tier part and a second tier part, and a second cross-sectional area of the second tier part coupled to the sensor element circuitry is smaller than a first cross-sectional area of the first tier part. Accordingly, a thermal stress to be exerted on the sensor element circuitry of the sensor chip is reduced even when the electrically-conductive pillar thermally expands due to an increase in an ambient temperature or heating from outside. The sensor chip thus achieves stable detection performance. A method of manufacturing a sensor device according to at least one embodiment of the disclosure makes it possible to manufacture such a sensor device.

The sensor device according to at least one embodiment of the disclosure provides more stable detection performance and is suited to further reduction in size. The method of manufacturing a sensor device according to at least one embodiment of the disclosure makes it possible to manufacture such a sensor device.

It is to be noted that the effects of the disclosure should not be limited thereto, and may be any of the effects described herein.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A sensor device comprising:
a support having a first surface;
a sensor chip provided on the first surface and including a substrate and a sensor element circuitry, the substrate having a second surface, the sensor element circuitry being provided on the second surface; and
an electrically-conductive pillar provided on the first surface, wherein
the electrically-conductive pillar has a pillar height from the first surface to an upper end of the electrically-conductive pillar, the sensor chip has a chip height from the first surface to the second surface, and the pillar height is greater than the chip height, and
the electrically-conductive pillar includes a structure in which a first tier part having a first cross-sectional area and a second tier part having a second cross-sectional area smaller than the first cross-sectional area are stacked in order from the first surface,
wherein a top surface of the first tier part is located below the sensor element circuitry in a height direction, and
wherein the first tier part is disposed at a position corresponding to a part of the sensor chip, such that an entirety of the first tier part overlaps with the part of the sensor chip in an in-plane direction orthogonal to a stacking direction of the sensor device.

2. The sensor device according to claim 1, wherein the second tier part is located to overlap with the sensor element circuitry in the in-plane direction along the first surface.

3. The sensor device according to claim 1, wherein, in the in-plane direction along the first surface, the first tier part is located at a first distance from the substrate of the sensor chip, the second tier part is located at a second distance from the substrate of the sensor chip, and the second distance is greater than the first distance.

4. The sensor device according to claim 1, wherein the sensor element circuitry includes a sensor element having sensitivity that varies depending on a stress.

5. The sensor device according to claim 4, wherein the sensor element comprises a magnetic sensor element or a strain sensor element.

6. The sensor device according to claim 1, further comprising a wiring line that electrically couples the sensor element circuitry and the electrically-conductive pillar to each other, wherein
the sensor chip and the electrically-conductive pillar are each provided in a tier between the support and the wiring line.

7. The sensor device according to claim 6, further comprising an electrically-conductive layer provided on a surface, of the wiring line, farther from the support.

8. The sensor device according to claim 1, wherein the first tier part has a first height, the second tier part has a second height, and the first height is greater than the second height.

9. The sensor device according to claim 1, wherein the electrically- conductive pillar is provided on the first surface at a location different from a location of the sensor chip, and is electrically coupled to the sensor element circuitry.

10. A method of manufacturing a sensor device, the method comprising:
preparing a support having a first surface;
forming a first tier part on the first surface;
disposing a sensor chip on the first surface at a location different from a location of the first tier part, the sensor chip including a substrate, a sensor element circuitry, and a pad part, the substrate having a second surface, the sensor element circuitry and the pad part being provided on the second surface;
forming an insulating film to cover the first tier part formed on the first surface and the sensor chip disposed on the first surface;
forming, in the insulating film, a first opening at a location corresponding to the first tier part and a second opening at a location corresponding to the pad part; and
forming an electrically-conductive pillar including the first tier part and a second tier part stacked on the first tier part, by forming an electrically-conductive film to fill each of the first opening and the second opening and to selectively cover a portion of the insulating film,
wherein a top surface of the first tier part is formed to be located below the sensor element circuitry in a height direction, and
wherein the first tier part is formed to be disposed at a position corresponding to a part of the sensor chip, such that an entirety of the first tier part overlaps with the part of the sensor chip in an in-plane direction orthogonal to a stacking direction of the sensor device.

11. The method of manufacturing the sensor device according to claim 10, wherein a second cross-sectional area of the second tier part along the first surface is smaller than a first cross-sectional area of the first tier part along the first surface, by causing an opening cross-sectional area of the first opening along the first surface to be smaller than the first cross- sectional area.

* * * * *